US010498399B1

(12) United States Patent
Kamkar et al.

(10) Patent No.: US 10,498,399 B1
(45) Date of Patent: Dec. 3, 2019

(54) NEAR FIELD DETECTION OF MOBILE DEVICES

(71) Applicant: OpenPath Security Inc., Marina Del Rey, CA (US)

(72) Inventors: Samy Kamkar, Los Angeles, CA (US); Robert J. Peters, Culver City, CA (US); Alexander A. Kazerani, Santa Monica, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 0 days.

(21) Appl. No.: 15/994,547

(22) Filed: May 31, 2018

(51) Int. Cl.
| | |
|---|---|
| *H04B 5/00* | (2006.01) |
| *H04L 29/06* | (2006.01) |
| *H04W 76/14* | (2018.01) |
| *H04W 76/15* | (2018.01) |
| *H04W 4/80* | (2018.01) |
| *H04W 12/06* | (2009.01) |
| *H04W 84/12* | (2009.01) |
| *H04W 84/18* | (2009.01) |

(52) U.S. Cl.
CPC ......... *H04B 5/0031* (2013.01); *H04B 5/0043* (2013.01); *H04L 63/08* (2013.01); *H04W 76/14* (2018.02); *H04W 76/15* (2018.02); *H04J 2211/005* (2013.01); *H04W 4/80* (2018.02); *H04W 12/06* (2013.01); *H04W 84/12* (2013.01); *H04W 84/18* (2013.01)

(58) Field of Classification Search
CPC ....... H04W 68/00; H04W 4/008; H04W 4/02; G01R 33/02; G01R 33/03; G08B 13/24; G01B 7/004; G06Q 20/32; G06Q 20/36

USPC .............................................. 455/41.1, 41.2
See application file for complete search history.

(56) References Cited

U.S. PATENT DOCUMENTS

| | | | |
|---|---|---|---|
| 10,034,268 B1 * | 7/2018 | Hazlewood | H04W 4/02 |
| 10,227,818 B2 * | 3/2019 | Kincaid | E06B 7/28 |
| 2016/0189506 A1 * | 6/2016 | Peterson | G08B 13/24 340/551 |
| 2016/0245638 A1 * | 8/2016 | Sheinker | G01C 21/005 |
| 2016/0253050 A1 * | 9/2016 | Mishra | G06F 3/0482 715/727 |
| 2017/0225336 A1 * | 8/2017 | Deyle | G01V 8/10 |
| 2018/0180683 A1 * | 6/2018 | Tarlow | G01R 33/0035 |

* cited by examiner

*Primary Examiner* — Edward F Urban
*Assistant Examiner* — Max Mathew
(74) *Attorney, Agent, or Firm* — Ansari Katiraei LLP; Arman Katiraei; Sadiq Ansari

(57) ABSTRACT

Near field detection using a magnetometer is disclosed. A transmitter may distort magnetometer measurements of Earth's magnetic field by producing rapid but controlled fluctuations to encode a specific message in a manipulated magnetic field. When a mobile device is brought in range of the transmitter, a magnetometer of the mobile device detects that manipulated magnetic field. An application running on the mobile device forms messages based on the magnetometer output. In response to detecting the specific message, the application may execute an action on the mobile device or a remote device. NFC read-based near field detection similarly involves the application accessing an NFC chip of the mobile device, and scanning for one or more particular NFC tags that are read by the NFC chip. In response to detecting a particular NFC tag, the application executes an action on the mobile device or a remote device.

17 Claims, 7 Drawing Sheets

NEAR FIELD DETECTION OF MOBILE DEVICES

BACKGROUND ART

Near field detection is the ability to detect the presence of a mobile device or an individual carrying the mobile device from a short distance. Limiting near field detection to a range that is less than two feet may improve detection accuracy, and more specifically, the ability to detect a particular mobile device that is closest to a specific point of interest from other nearby mobile devices.

Mobile devices, such as smartphones, may have several different wireless radios, antennas, or integrated circuits for wireless communications using different wireless technologies. Each wireless technology may be associated with a different range. 4G Long Term Evolution ("LTE") and WiFi are considered to be long range wireless technologies. Bluetooth and Near Field Communication ("NFC") are considered to be short range wireless technologies.

Despite being considered a short range wireless technology, Bluetooth has a range of several feet which makes it an unreliable and an inaccurate wireless technology for near field detection. For example, a Bluetooth transmitter may be discoverable by any Bluetooth enabled device that is within several feet of the Bluetooth transmitter. The Bluetooth transmitter may be unable to accurately determine, without lengthy message exchanges, which of the Bluetooth enabled devices is closest to the Bluetooth transmitter, or has an established connection with the Bluetooth transmitter.

NFC has an operating range of a few inches (e.g., up to 6 inches), and is therefore well suited for near field detection. However, not all mobile devices include an NFC chip. Some mobile devices that include an NFC chip restrict third-party access to the chip or limit its usage.

DETAILED DESCRIPTION

Systems and/or methods, as described herein, provide near field detection of mobile devices using existing hardware of the mobile devices. In some embodiments, the near field detection is performed using a mobile device magnetometer. In some embodiments, the near field detection is performed using limited Near Field Communication ("NFC") access. For instance, the near field detection may be implemented based on access to read or receive from an NFC chip of a mobile device without access to write or send from the NFC chip of the mobile device.

Figure 1:
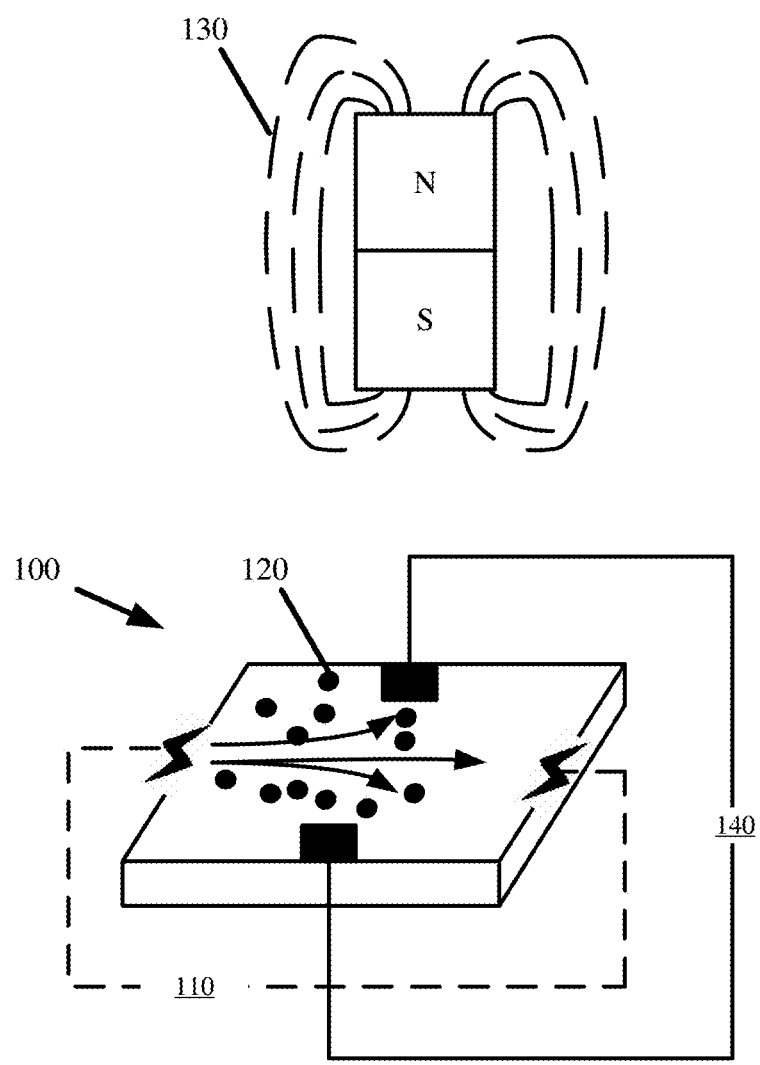
FIG. 1 illustrates an example magnetometer that can be used for near field detection in accordance with some embodiments.

A magnetometer is hardware that is present on many mobile devices including smart phones, smartwatches, activity or fitness trackers, music and game playing devices, and other on-person mobile devices (e.g., mobile devices carried by a user). The magnetometer may be a Hall-effect sensor or transducer that detects magnetic field fluctuations, and that varies its output voltage in response to the detected fluctuations. FIG. 1 illustrates an example magnetometer 100 that can be used for near field detection in accordance with some embodiments.

As shown, magnetometer 100 may be an integrated circuit with a p-type semiconductor base through which a current 110 is passed. The p-type semiconductor base may include one or more of gallium arsenide, indium antimonide, indium arsenide, or other materials. These materials are sensitive to magnetic forces. In particular, the charge carriers (e.g., electrons and holes 120) move between either side of the semiconductor base in response to the position and/or strength of magnetic field 130. The movement of the charge carriers produces a measurable change in output voltage 140 from which fluctuations in magnetic field 130 can be measured.

A primary application of the magnetometer in mobile devices is to detect fluctuations in Earth's magnetic field, and to provide a digital compass for navigational purposes. Mobile device magnetometers operate in an extremely low frequency ("ELF") range of 3 to 30 hertz ("Hz"), corresponding to the frequency of Earth's electromagnetic field (also referred to as the Schumann resonance).

The magnetometer based near field detection of some embodiments may involve triggering an action on a mobile device in response to detecting, with the magnetometer of the mobile device, a manipulated magnetic field that encodes a specific message. The manipulated magnetic field distorts measurements of Earth's magnetic field over a short distance. To the mobile device magnetometer and/or a digital compass, navigation application, and/or other applications that access the magnetometer, the manipulated magnetic field has a sequence of fluctuations that make it seem as if the mobile device is experiencing a sequence of rapid movements. However, in some embodiments, the manipulated magnetic field fluctuations encode a specific message that is easily and accurately distinguishable from random or ordinary movements of the mobile device.

Some embodiments provide a near field transmitter that distorts magnetometer measurements of Earth's magnetic field, causing the magnetometer to instead detect and measure a manipulated magnetic field that is generated by the near field transmitter. The near field transmitter may generate the manipulated magnetic field by producing rapid but controlled fluctuations (e.g., every fraction of a second) at the ELF corresponding to the frequency at which Earth's magnetic field resonates. A set or sequence of the controlled fluctuations may encode a specific message. The near field transmitter may then repeat the set or sequence of fluctuations to repeat transmission of the specific message within the manipulated magnetic field.

The set or sequence of fluctuations can vary depending on the length of the specific message. For example, the near field transmitter and magnetometer may operate at 20 Hz. The near field transmitter may generate a 6-interval message via a different magnetic field fluctuation every $1/20^{th}$ of a second. In this case, the near field transmitter repeats the same set of fluctuations every $6/20^{th}$ of a second with each fluctuation occurring every $1/20^{th}$ of a second. The fluctuations can be used to encode any data or information in the message. The message may include a unique value or identifier associated with the near field transmitter. For instance, the identifier may include a name, address, Uniform Resource Locator ("URL"), or other value for identifying or accessing the near field transmitter via one or more wireless technologies.

The magnetometer may detect the fluctuations of the manipulated magnetic field as different headings. For example, the 6-interval message may include the specific heading sequence of 93 degrees, 23 degrees, 240 degrees, 164 degrees, 200 degrees, and 17 degrees with the measurement of each heading occurring at every $1/20^{th}$ of a second. To the magnetometer, this sequence appears as if the mobile device is rapidly moving. However, the specific heading sequence may encode an identifier that uniquely identifies the near field transmitter. In some embodiments, the encoding/decoding of the specific message may allow for a variance of +/−5 degrees in the magnetometer measurements to account for uncalibrated or inaccurate readings from the magnetometer. In other words, the encoding/decoding may account and correct for inconsistencies and inaccuracies of different magnetometers.

The near field transmitter may transmit the manipulated magnetic field a short distance (e.g., a few inches) from the near field transmitter via a radio-frequency identification ("RFID") antenna or other antenna of the near field transmitter. The distance the manipulated magnetic field extends from the near field transmitter may be controlled based on the power output or the actual amount of power of radio frequency energy used to transmit the manipulated magnetic field from the near field transmitter antenna. For purposes of near field detection, the range will be between 1-12 inches, although a greater range can be produced depending on the desired closeness of the near field detection.

The mobile device magnetometer may detect the manipulated magnetic field when placed the short distance from the near field transmitter. The magnetometer may operate at the same ELF at which the manipulated magnetic field is generated, and may therefore measure each magnetic field fluctuation that is generated by the near field transmitter at each interval. The magnetometer may output a heading or raw data for each measurement. Each measurement is typically an array of bits or multiple bits for a multi-dimensional value such as a heading.

A near field detection application running on the mobile device with access to the magnetometer decodes the specific message from the magnetometer measurements or output. For example, if the near field detection application is configured to detect 5-interval messages, and the ELF at which the near field transmitter and magnetometer operate is 20 Hz, the near field detection application may combine the bits, binary data, or other raw data from the last 5 magnetometer measurements or output to produce a different 5-interval message every $1/20$ of a second. In this example, each 5-interval message may include magnetometer output that spans a quarter second (e.g., $5/20$). The near field detection application may then decode the combined 5-interval message for specific values or identifiers encoded therein. As a simple example, assume that the magnetometer output represents headings North ("N"), North-West ("NW"), West ("W"), South-West ("SW"), South ("S"), South-East ("SE"), East ("E"), and North-East ("NE"). A 5-interval message may include any combination of the 5 headings (e.g., N,W,NE,SW,E). The near field detection application may be configured to combine the raw data for each heading sequence into a message. The near field detection application may also decode each 5-interval message, and/or detect one or more specific messages that are uniquely generated by one or more near field transmitters. The one or more specific messages may encode specific identifiers used for the near field detection, including the identification of specific near field transmitters, remote devices, or actions/services. In response to decoding and detecting a specific message, the near field detection application may trigger one or more actions that are executed on or from the mobile device.

Figure 2:
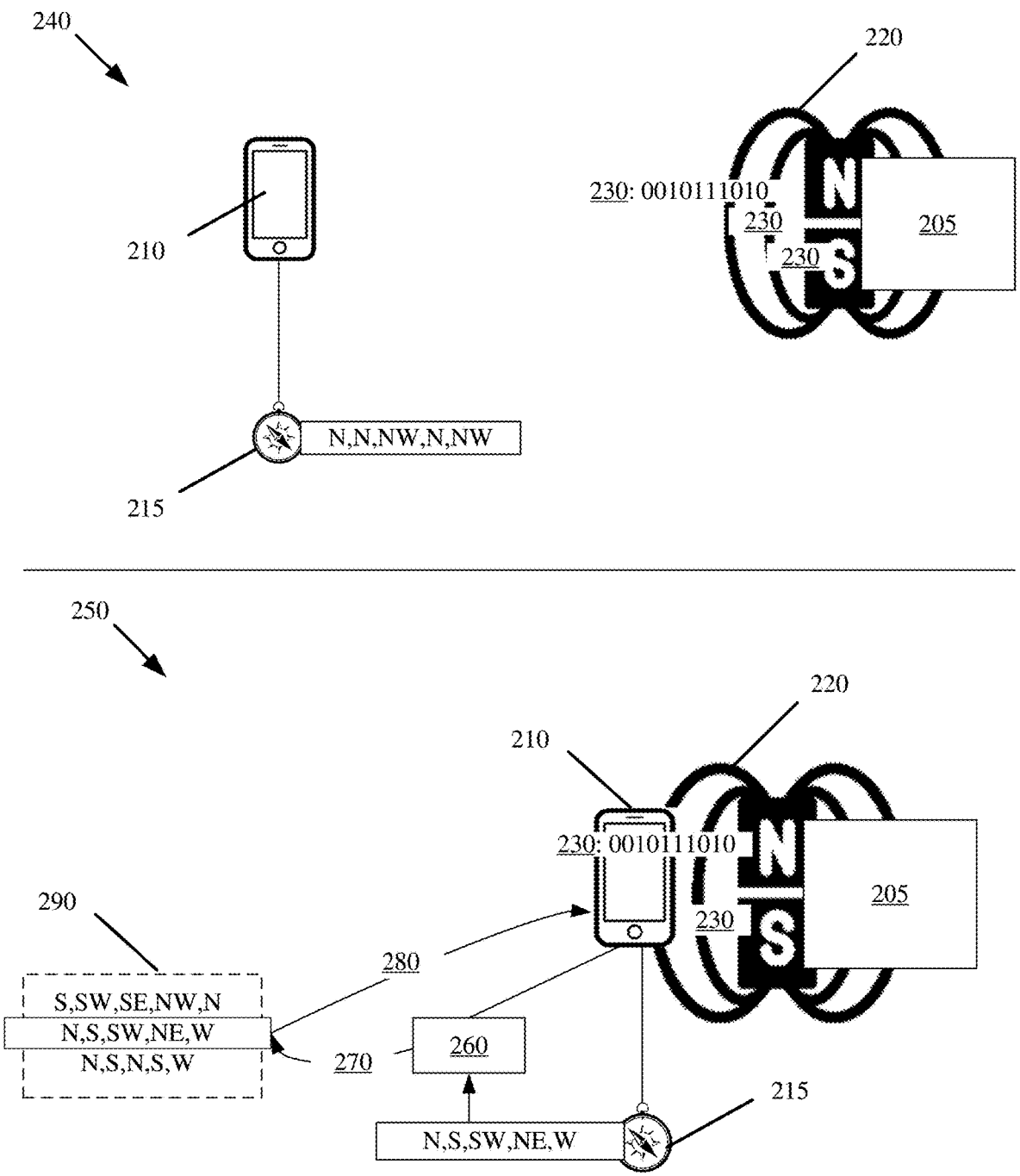
FIG. 2 illustrates an example of near field detection based on a manipulated magnetic field encoding a specific multi-bit message.

FIG. 2 illustrates an example of near field detection based on a manipulated magnetic field encoding a specific message. The figure illustrates near field transmitter 205 and mobile device 210. Mobile device 210 includes magnetometer 215.

Near field transmitter 205 generates manipulated magnetic field 220 in the ELF range (e.g., 20 Hz). Near field transmitter 205 produces fluctuations within manipulated magnetic field 220 to encode a repeating message 230. Manipulated magnetic field 220 may extend a few inches from near field transmitter 205.

At location 240, mobile device 210, and more specifically, magnetometer 215 are outside the range of manipulated magnetic field 220. Accordingly, magnetometer 215 may operate normally by outputting one or more bits that represent a heading, vector, or other raw data based on the Earth's magnetic field.

At location 250, mobile device 210 enters in range of manipulated magnetic field 220 produced by near field transmitter 205. Magnetometer 215 of mobile device 210 detects rapid fluctuations when in range of manipulated magnetic field 220 (e.g., a different heading at each interval of the ELF). Magnetometer 215 may convert the fluctuations to bits or other raw data representing different headings or vectors. A sequence of these fluctuations encodes the specific message that is associated with the near field detection.

Near field detection application 260 running on mobile device 210 may continuously receive or obtain output from magnetometer 215. Near field detection application 260 may combine, form, and/or decode different messages based on the one or more bits (e.g., representing a heading or vector) or raw data output by magnetometer 215 at each ELF interval. Again assuming that magnetometer 215 and near field transmitter 205 operate at a 20 Hz frequency, near field transmitter 205 may generate a repeating 10-interval message every half second or a repeating 5-interval message every quarter of a second, and near field detection application 260 may form and detect the 10-interval or 5-interval message from the output of magnetometer 215.

Near field detection application 260 may compare (at 270) the decoded messages against a configured set of specific messages 290 that coincide with the repeating messages that are transmitted in manipulated magnetic fields 220 produced by one or more near field transmitters 205. In some embodiments, the message may provide an identifier that identifies near field transmitter 205. For instance, the identifier can provide a unique name, address, or other value associated with the transmitting near field transmitter 205. Different near field transmitters 205 may encode different messages in their respective manipulated magnetic fields with each message providing a different identifier associated with a different near field transmitter 205. In some embodiments, the message may provide an identifier that identifies an entry point adjacent to near field transmitter 205, other device, or operation that is associated with the action triggered in response to the near field detection. As noted above, the specific messages for near field detection will be unique in the sense that magnetometer 215 is highly unlikely to produce the same messages from random or ordinary movement of mobile device 210. The likelihood can be decreased by increasing the number of intervals, and thereby, the number of possible data combinations or bits, used to encode the specific message.

In response to near field detection application 260 detecting (at 270) one of the configured set of messages 290 in the magnetometer output, near field detection application 260 may trigger (at 280) one or more actions. The actions may identify the near field detection of near field transmitter 205 by mobile device 210, and/or perform a sequence of operations that are conditioned on the near field detection of near field transmitter 205. The actions can be locally executed on mobile device 210, or may include remote interaction between mobile device 210 and another device via wireless communication over one or more wireless networks or radios of mobile device 210 (e.g., Bluetooth, WiFi, 4G LTE, 5G, etc.).

Figure 3:
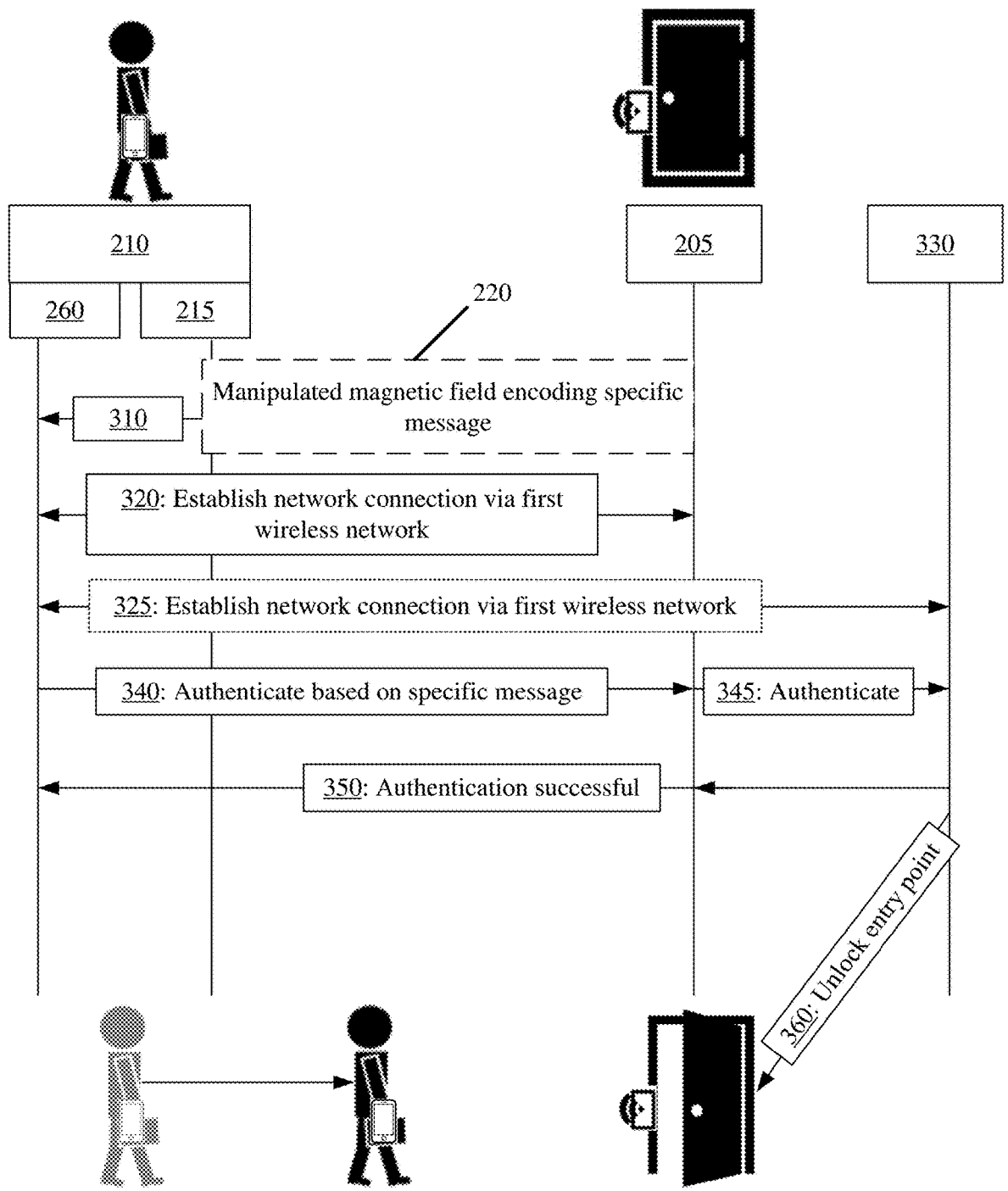
FIG. 3 illustrates an example of a mobile device triggering an access control operation based on the near field detection of a near field transmitter by the mobile device.

FIG. 3 illustrates an example of mobile device 210 triggering an access control operation based on the near field detection of near field transmitter 205. In this figure, mobile device 210 may be located a few inches from near field transmitter 205. At this range, magnetometer 215 of mobile device 210 may be affected by manipulated electromagnetic field 220 being generated by near field transmitter 205. A digital compass that is based on the output of magnetometer 215 may rapidly change heading or direction in response to the rapid fluctuations from manipulated electromagnetic field 220. However, near field detection application 260 running on mobile device 210 identifies (at 310), from the output of magnetometer 215, that the fluctuations encode a particular message for triggering an access control action.

The access control action may include establishing (at 320) a network connection over a first wireless network between mobile device 210 and near field transmitter 205. For example, mobile device 210 may establish a network connection over Bluetooth with near field transmitter 205. The particular message may provide a name, Bluetooth identifier, address, or other value with which mobile device 210 can connect to near field transmitter 205. Alternatively, near field transmitter 205 may repeatedly broadcast, via Bluetooth, its name, Bluetooth identifier, address, or other value. Mobile device 210 may detect the broadcast Bluetooth signal long before near field detection application 260 detects the particular message. However, the particular message may be a trigger that causes mobile device 210 to establish a network connection with near field transmitter 205.

As another example, mobile device 210 may establish (at 325) a network connection over a WiFi, 4G Long Term Evolution (LTE), or 5G wireless network with a remote Access Control Unit ("ACU") 330. The ACU may control access to a locked door or other entry point that is adjacent to the near field transmitter 205. In this case, the particular message may provide a name, URL, address (e.g., Internet Protocol ("IP") address), or other value with which mobile device 210 can connect to ACU 330.

The network connection may be established because mobile device 210 is unable to communicate with near field transmitter 205 or other devices using the magnetometer, and/or because of the ELF at which the magnetometer operates. In contrast, the established network connection may provide a high bandwidth and longer-range communication medium for completing the access control action.

Over the established network connection, mobile device 210 or near field detection application 260 may authenticate (at 340) itself based in part on the specific message. By providing the specific message that may only be detected by the magnetometer, mobile device 210 verifies that it is physically next to near field transmitter 205. The authentication may further include mobile device 210 providing security credentials or access privileges to verify identity and permissions of mobile device 210 or a user associated with mobile device 210. In some embodiments, near field transmitter 205 changes the particular message periodically. Consequently, mobile device 210 verifies its location next to near field transmitter by sending the most recent particular message. This prevents mobile device 210 from falsely verifying its location using the same message.

As part of the authentication (at 340), mobile device 210 or near field detection application 260 may submit a request to unlock a particular door or other entry point associated with or adjacent to near field transmitter 205. The particular door can be identified by virtue of the particular message that mobile device 210 provides during authentication or with the request to unlock. As noted above, the particular message may be used to verify location of mobile device 210 next to near field transmitter 205, or may include an identifier that identifies a particular door or near field transmitter 205 associated with the door.

In some embodiments, near field transmitter 205 may have a network connection to ACU 330, and may proxy (at 345) the authentication, unlock request, and other messaging to ACU 330. In embodiments where the network connection is established (at 325) with ACU 330, mobile device 210 or near field detection application 260 may directly authenticate with and request access from ACU 330, and bypass near field transmitter 205. In still some other embodiments, mobile device 210 may simultaneously send the authentication information over a first network connection with near field transmitter 205 and over a second network connection with ACU 330.

If successfully authenticated (at 350), ACU 330 may unlock (at 360) the requested door or entry point, and provide user access through the door or entry point. ACU 330 may issue an unlock command over a network or wired connection to a lock controller that controls the physical locking and unlocking of the door.

It should be noted that the operations of FIG. 3, and specifically the unlocking (at 360) of the door, are performed with no human involvement other than the human physically bringing mobile device 210 in range of manipulated electromagnetic field 220 being generated by near field transmitter 205. In other words, the door is unlocked without the user unlocking mobile device 210, interacting with or performing some gesture on mobile device 210 to request unlocking of the door, or interacting in any way with the door, near field transmitter 205, ACU 330, or the lock on the door other than to push open and walk through the unlocked door.

In some embodiments, near field transmitter 205 is part of an access control reader. The access control reader may include other forms of wireless communication with which to authenticate user access to an entry point that is associated with or adjacent to the access control reader. For example, the access control reader may be able to communicate with and obtain access credentials from proximity cards that operate at 125 kilohertz ("KHz"), smart cards and NFC enabled devices at 13.56 megahertz ("MHz"), and/or with mobile devices via Bluetooth, WiFi, and other different wireless network technologies. The access control reader may also have a network connection to ACU 330 in order to provide access credentials and other information obtained from a nearby device to ACU 330 for authentication.

Figure 4:
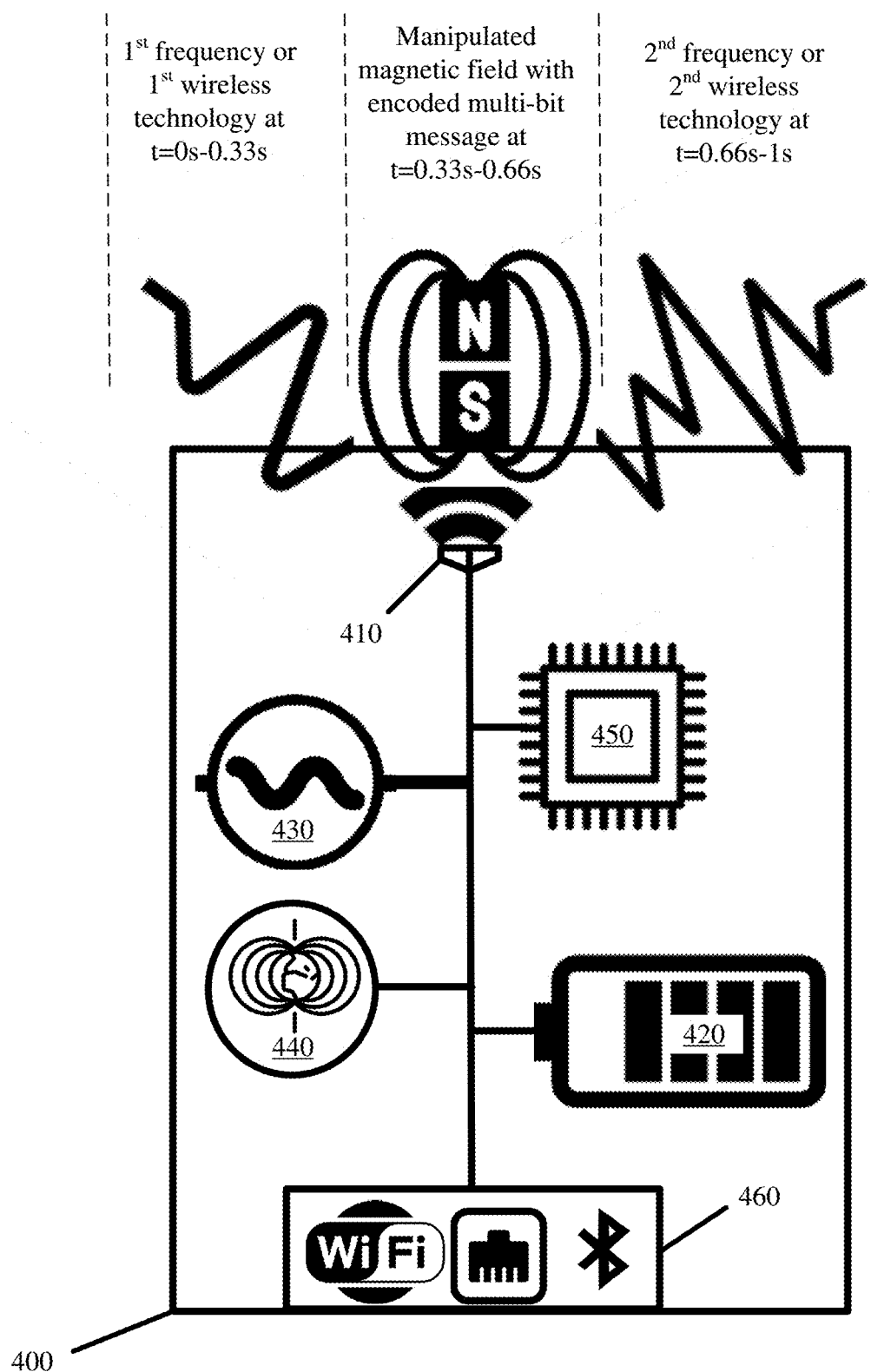
FIG. 4 illustrates an access control reader with near field transmitter functionality in accordance with some embodiments.

FIG. 4 illustrates access control reader 400 with near field transmitter 205 functionality in accordance with some embodiments. Access control reader 400 has at least one antenna 410, power source 420, signal generator 430, electromagnetic field generator 440, controller 450, and network interface 460.

Antenna 410 may include one or more antennas that are used to send and receive signaling, and to generate the manipulated magnetic fields for near field detection via a magnetometer. For instance, antenna 410 may include a first antenna for sending signaling, and a second antenna for receiving signaling. Antenna 410 may also include a first antenna that operates at a first frequency of a first wireless technology, and a second antenna that operates at a different second frequency of a different second wireless technology. For instance, the first antenna may be used to transmit the manipulated magnetic field encoding the message at the ELF that can be detected by magnetometer 215 of mobile device 210, and the second antenna may be used to send and/or receive signaling in conjunction with a Bluetooth, Wifi, 4G LTE, or 5G radio. As another example, the first antenna may be used to transmit the manipulated magnetic field, and the second antenna may communicate with RFID cards or mobile devices, via NFC, at 13.56 MHz, and/or with proximity cards at 125 KHz.

Power source 420 may include an onboard power supply, an external power supply, or both. The onboard power supply can be a battery or capacitor. The external power supply can provide a continuous supply of electricity.

Signal generator 430 may be a first circuit, chip, or processor that generates one or more signals at one or more frequencies for communication with access devices that operate at the same frequencies. For instance, signal generator 430 may generate a first signal for communicating with proximity cards that operate at 125 Mhz. The signal generator 400 may generate an excitation signal to power a transponder of a proximity card, and exchange (e.g., send and/or receive) data with the proximity card at 125 MHz, wherein the frequency of the excitation signal preferably corresponds to the frequency of data signals communicated between the proximity card and the access control reader. Alternatively or additionally, signal generator 430 may generate a second signal for communication with smart cards or NFC devices that operate at 13.56 MHz. Signal generator 430 may again generate an excitation signal for the smart cards, send NFC tag identifiers, and/or exchange data at 13.56 MHz. Signal generator 430 may generate the various signals using power from power source 420, and may transmit the generated signals through antenna 410.

Electromagnetic field generator 440 may be a second circuit, chip, or processor that may operate at a different frequency range than signal generator 430. For instance, electromagnetic field generator 440 may operate at a particular frequency within the ELF range (e.g., between 3 and 30 Hz). Using power from power source 420 and by transmitting at the ELF frequency via antenna 410, electromagnetic field generator 440 may generate an electromagnetic field that emulates the Earth's magnetic field. Electromagnetic field generator 440 may control and manipulate the electromagnetic field to create fluctuations that repeatedly encode a specific message. In this manner, electromagnetic field generator 440, and access control reader 400, may replicate functionality and/or operation of near field transmitter 205. As before, the generated electromagnetic field may be detectable by a magnetometer at a very short distance from antenna 410. In some embodiments, the electromagnetic field extends 1-12 inches from access control reader 400.

Controller 450 may by a processor that controls access to antenna 410 by periodically switching between transmission of the different frequency signals generated by signal generator 430 and electromagnetic field generator 440. For example, controller 450 may enable transmission of the one or more signals from signal generator 430 during a first half of each second, and may switch to enable transmission of the signals from electromagnetic field generator 440 during a second half of each second. Controller 450 may transmit one signal for a greater amount of time than another signal, or may switch between the different signals at different frequencies. For example, the ELF at which electromagnetic field generator 440 operates may require more time, than the high frequency at which signal generator 430 operates, to disseminate the specific message one or more times.

Controller 450 may further control three modes of operation for the access control reader. For example, controller 450 may operate the access control reader as a proximity card reader during a first interval at which a 125 KHz signal is transmitted from signal generator 430 through antenna 410. Controller 450 may then operate the access control reader as a smart card or NFC reader during a second interval at which a 13.56 MHz signal is transmitted from signal generator 430 through antenna 410. Controller 450 may then operate the access control reader as a near field detection device during a third interval at which an ELF signal is transmitted from electromagnetic field generator 440 through antenna 410. Each of the first, second, and third intervals may span a fraction of a second.

Controller 450 may also include logic for temporarily retaining operation at a given frequency in response to receiving or detecting communication from an external device (e.g., mobile device, proximity card, smart card, etc.) at that given frequency. Controller 450 may continually scan antenna 410 for received signaling, and may decode or process the received signaling. As noted above, antenna 410 may include a first antenna for transmitting signals from signal generator 430 or electromagnetic field generator 440, and a second antenna for receiving signals from external devices.

In response to detecting signaling from an external device (e.g., a proximity card) at a first frequency (e.g., 125 KHz), controller 450 may cause signal generator 430 to continue operating at the first frequency and complete communication with the detected device, thereby temporarily restricting the switching of signal generator 430 to a second frequency, and restricting electromagnetic field generator 440 access to antenna 410. For instance, controller 450 may cause access control reader 400 to continue operating at the first frequency in order to request and receive identification parameters and/or security credentials from the detected device at the first frequency. Similarly, in response to detecting signaling from an external device (e.g., a smart card) at a second frequency (e.g., 13.56 MHz), controller 450 may cause signal generator 430 to continue operating at the second frequency and complete communication with the detected device.

Network interface 460 may provide one or more wireless and/or wired network connections for communication via one or more network technologies. Network interface 460 may connect the access control reader to an ACU, and facilitate communications between the two. Network interface 460 may also allow access control reader 400 to connect and communicate with a mobile device over a higher bandwidth, more secure, and more reliable network connection than is available via the ELF, 125 KHz, or 13.56 MHz frequencies. For example, network interface 460 may support Bluetooth, Bluetooth Low Energy ("BLE"), WiFi, or other network connectivity. In some embodiments, the signals generated by signal generator 430 and electromagnetic field generator 440 may be triggers for communicating via an alternate network technology provided by network interface 460. For instance, any of the ELF, 125 KHz, or 13.56 MHz signals may be used for near field detection of a mobile device, access card, or other device, and may cause the near field detected device to establish a wireless network connection with network interface 460 using Bluetooth, BLE, WiFi, or other network technology that has more bandwidth, is more secure, and/or is more reliable than communicating via the signaling generated by either of signal generator 430 or electromagnetic field generator 440. Network interface 460 may then provide a high speed, secure, and reliable communication channel between a near field detected device and access control reader 400. Network interface 460 may also serve to proxy communications between a near field detected device through access control reader 400 to an ACU or other server or component of a system.

In some embodiments, controller 450 may execute one or more actions based on input received over antenna 410 or network interface 460. For instance, controller 450 may issue requests or commands to one or more Internet-of-Things ("IoT"), connected, or remove devices in response to near field detection of mobile device 110. Near field detection of mobile device 110 by controller 450 may be based on mobile device 110 establishing a connection with access control reader 400 over network interface 460, and mobile device 110 providing a specific message that electromagnetic field generator 440 generates and transmits via ELF through antenna 410. Mobile device 110 returning the specific message over network interface 460 is an indication that mobile device 110 is in close proximity to access control reader 400. Accordingly, controller 450 may execute one or more actions including requesting a door unlock from the ACU, directly unlocking a door under access control reader 400 control, or controlling other IoT, connected, or remote devices (e.g., lights, thermostats, vehicles, etc.).

Figure 5:
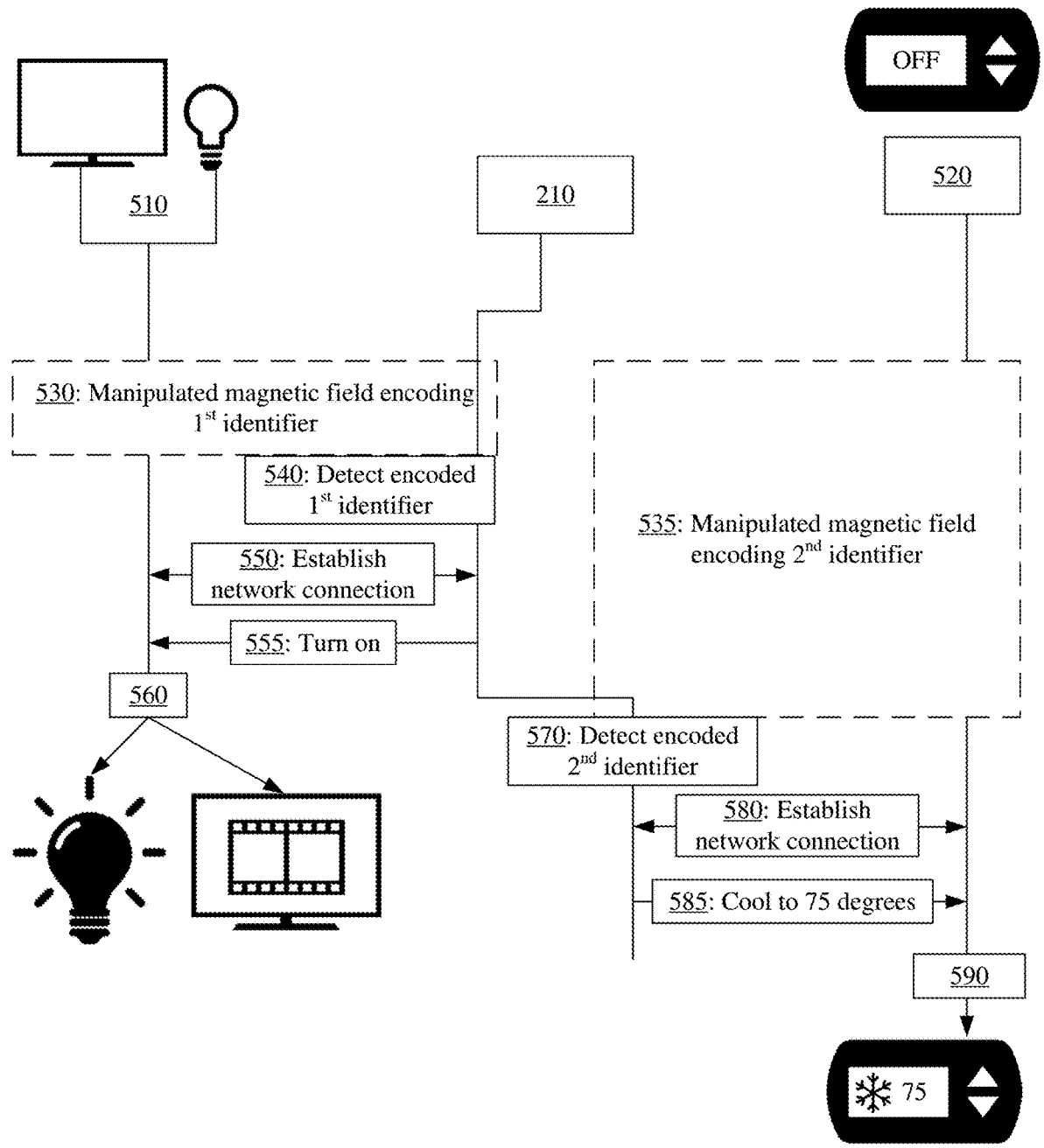
FIG. 5 illustrates an example of a near field transmitter being incorporated as part of a home automation system, and controlling different devices in the home based on near field detection of a mobile device.

Accordingly, besides an access control system, near field transmitter 205 or the near field detection described herein may be part of other systems and other applications that rely on near field detection. FIG. 5 illustrates an example of near field transmitter being incorporated as part of a home automation system, and controlling different devices in the home based on near field detection of a mobile device 210.

FIG. 5 illustrates different near field transmitters 510 and 520 with controller functionality that may be placed throughout a user's home. Each near field transmitter 510 and 520 may control one or more IoT or connected devices in a room or in the home. In this figure, near field transmitter 510 may control (e.g., turn on and off) lights and a television, and near field transmitter 520 may control a heating and cooling system, in response to near field detection of a particular mobile device carried by the user. Each near field transmitter 510 and 520 may control other IoT or connected devices in the home or outside the home.

Each near field transmitter 510 and 520 generates (at 530 and 535) a short-range electromagnetic field. In this figure, each near field transmitter 510 and 520 fluctuates the electromagnetic field to produce a manipulated magnetic field that encodes a different message. Each message represents a different identifier associated with a near field transmitter 510 or 520.

Magnetometer of mobile device 210 may detect each manipulated magnetic field when the mobile device 210 is brought within a few inches (e.g., less than 12 inches) from the near field transmitter that generates the manipulated magnetic field. As shown, mobile device 210 is first moved within the manipulated magnetic field created by near field transmitter 510. The magnetometer of mobile device 210 may detect the magnetic field fluctuations generated by near field transmitter 510. A near field detection application on mobile device 210 reads the magnetometer output and detects (at 540) the first identifier that is associated with near field transmitter 510 from decoding the magnetometer output.

In response to detecting the first identifier, mobile device 210 performs a first triggering action. The triggering action may include establishing (at 550) a wireless network connection with near field transmitter 510. The first identifier may include a name, address (e.g., IP address), URL, NFC tag, Universally Unique Identifier ("UUID"), or other value for communicating with near field transmitter 510. Mobile device 210 may also provide the first identifier as part of establishing (at 550) the wireless network connection with near field transmitter 510 so that near field transmitter 510 can verify near field detection of mobile device 210.

Mobile device 210 may then send (at 555) a command and/or security credentials or access credentials. The credentials may uniquely identify the user or mobile device 210, and/or may specify access or services authorized for mobile device 210 to near field transmitter 510. In response, near field transmitter 510, via the controller, may turn on or off the IoT or connected devices under control of that near field transmitter 510. For instance, near field transmitter 510 turns (at 560) one or more lights and televisions under its control.

Mobile device 210 may then be moved in range of the manipulated magnet field generated (at 535) by near field transmitter 520 at a different part of the home. The magnetometer of mobile device 210 is again affected by the manipulated magnetic field. The near field detection application on mobile device 210 reads the magnetometer output and detects (at 570) the second identifier that is associated with near field transmitter 520. Mobile device 210 may establish (at 580) a new network connection with near field transmitter 520 using the same or different wireless network technology as was used to connect with near field transmitter 510. The near field detection application may then send (at 585) a command to control the heating and cooling system, and near field transmitter 520 executes the command by setting the heating and cooling system based on the command issued (at 585) by mobile device 210. Here again, the lights, television, heating and cooling system, and other IoT or connected devices may be controlled without user involvement other than bringing mobile device 210 in range of the manipulated magnetic field generated by each near field transmitter 510 or 520.

Near field transmitter 205 may similarly be placed in an automobile. In some embodiments, near field transmitter 205 can be located in the driver door. Near field transmitter 205 creates an ELF electromagnetic field that is detectable by the magnetometer of a user's mobile device when the magnetometer is brought within range of the ELF electromagnetic field. The near field detection application detects, from the magnetometer output, electromagnetic field fluctuations that encode a specific message.

In response to detecting the specific message, the near field detection application may enable a low power wireless radio (e.g., Bluetooth) of the mobile device, if it is not already enabled. The near field detection application may then establish a secure connection to the vehicle, via a corresponding low power radio of the vehicle. The near field detection application may provide identification parameters and/or security credentials to the vehicle. The vehicle may unlock the door and/or turn itself on in response to successfully authenticating the user or the mobile device. Here again, the unlocking of the vehicle door and/or turning on the vehicle occurs with no involvement of the user other than bringing the mobile device in range of the electromagnetic field being generated by near field transmitter 205.

Near field detection can also be performed via NFC functionality. However, not all mobile devices include an NFC chip. Other mobile devices that include the NFC chip may restrict third-party access (e.g., third-party installed applications) to certain NFC functionality. For instance, some mobile devices allow third-party receiving of data via NFC, but restrict third-party sending of data via NFC. The sending of data via NFC on these mobile devices may be restricted to operating system or device manufacturer implemented applications or functionality, such as secure mobile payment.

The systems and methods provided herein may overcome these restrictions by providing NFC read-based near field detection. In some embodiments, the near field detection application running on a particular mobile device communicably couples to read from an NFC chip of the particular mobile device, and performs a triggering action on the particular mobile device in response to detecting a particular NFC tag that is read by the NFC chip.

Figure 6:
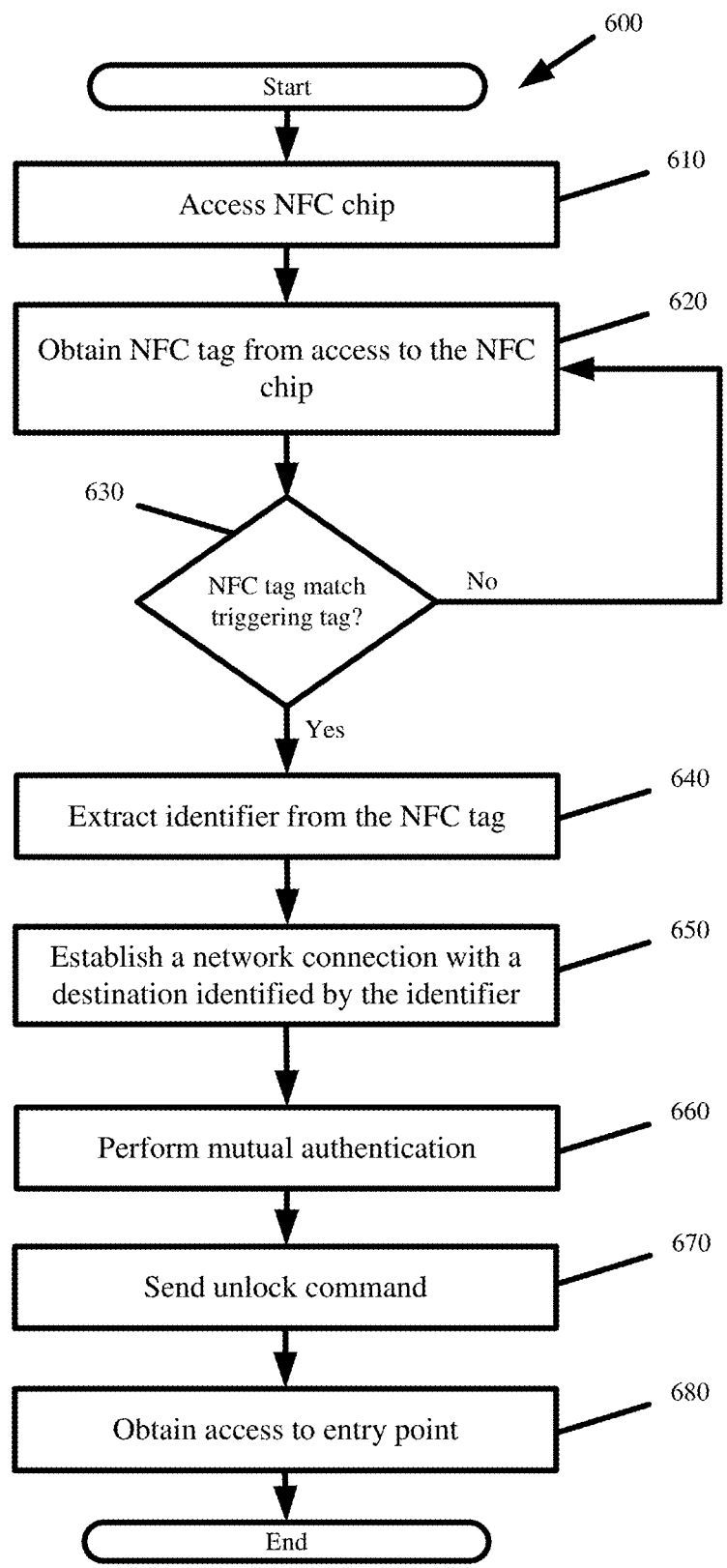
FIG. 6 presents an example process for NFC read-based near field detection in accordance with some embodiments.

FIG. 6 presents an example process 600 for NFC read-based near field detection in accordance with some embodiments. Process 600 may be performed by the near field detection application that is installed on a particular mobile device with an NFC chip. The near field detection application may be a third-party application and/or one that is running in the foreground or background of the particular mobile device.

Process 600 may include the application accessing (at 610) the NFC chip of the particular mobile device in order to read from the NFC chip. In particular, the application may access (at 610) the NFC chip in order to activate the NFC chip and/or receive NFC tags that the NFC chip detects when in range of an NFC transmitter. Access control reader 400 may be an example of an NFC transmitter that generates one or more specific NFC tags via signal generator 430, and that transmits the one or more specific NFC tags at the 13.56 MHz frequency via antenna 410. Process 600 may operate with other smart card readers operating at the 13.56 MHz frequency.

Process 600 may include obtaining (at 620) an NFC tag at the application based on the access to the NFC chip. Process 600 may also include the application determining (at 630) if the obtained NFC tag matches a triggering tag configured on the application. A triggering tag may be one that identifies a specific reader or other device associated with the near field detection system of some embodiments.

In response to determining (at 630—No) that the obtained NFC tag does not match a triggering tag, process 600 may continue to run and wait to obtain (at 620) a next NFC tag from the NFC chip. In response to determining (at 630—Yes) that the obtained NFC tag matches a triggering tag, process 600 may perform a triggering action.

In this example process, the triggering action involves initiating an unlocking of an access point. Accordingly, process 600 may include extracting (at 640) an identifier from the NFC tag. The identifier may provide the name, address, or other identification or means of connecting to the device transmitting the NFC tag via a different network technology. For instance, the identifier may be the Bluetooth name or beacon of the device.

Process 600 may include establishing (at 650) a connection, via a network technology other than NFC, with a destination identified by the identifier. Continuing with the example above, the application may issue a Bluetooth connection request to pair the mobile device on which the application executes with the device that is identified by the identifier from the NFC tag. The connection may be established as a secure or encrypted connection.

Process 600 may include performing (at 660) a mutual authentication of the connected devices as part of or after establishing the connection. Process 600 may then send (at 670) an unlock command and/or access credentials from the application to the destination device. If the unlock command is successful and/or the particular mobile device or user associated with the particular mobile device has sufficient access privileges, process 600 may include obtaining (at 680) access to an entry point that is adjacent to or associated with the destination device. In particular, the destination device may unlock the entry point or may forward the command and/or access credentials to an ACU that controls access to the entry point.

The triggering action of process 600 may be modified to achieve other tasks on the particular mobile device or other remote devices via a network technology other than NFC. For example, process 600 may be modified to control various IoT or other connected devices of a home automation system or other system. As another example, the triggering action of process 600 may be modified so that the network connection is established with the ACU rather than the destination device that transmits the NFC tag. In this case, the application may use a long-range radio of the particular mobile device to communicate with the ACU. For instance, the application may access a WiFi radio or 4G LTE radio of the particular mobile device, and send a data packet to an Internet Protocol (IP) address that is associated with the ACU and that is the identifier extracted (at 640) from the NFC tag.

Figure 7:
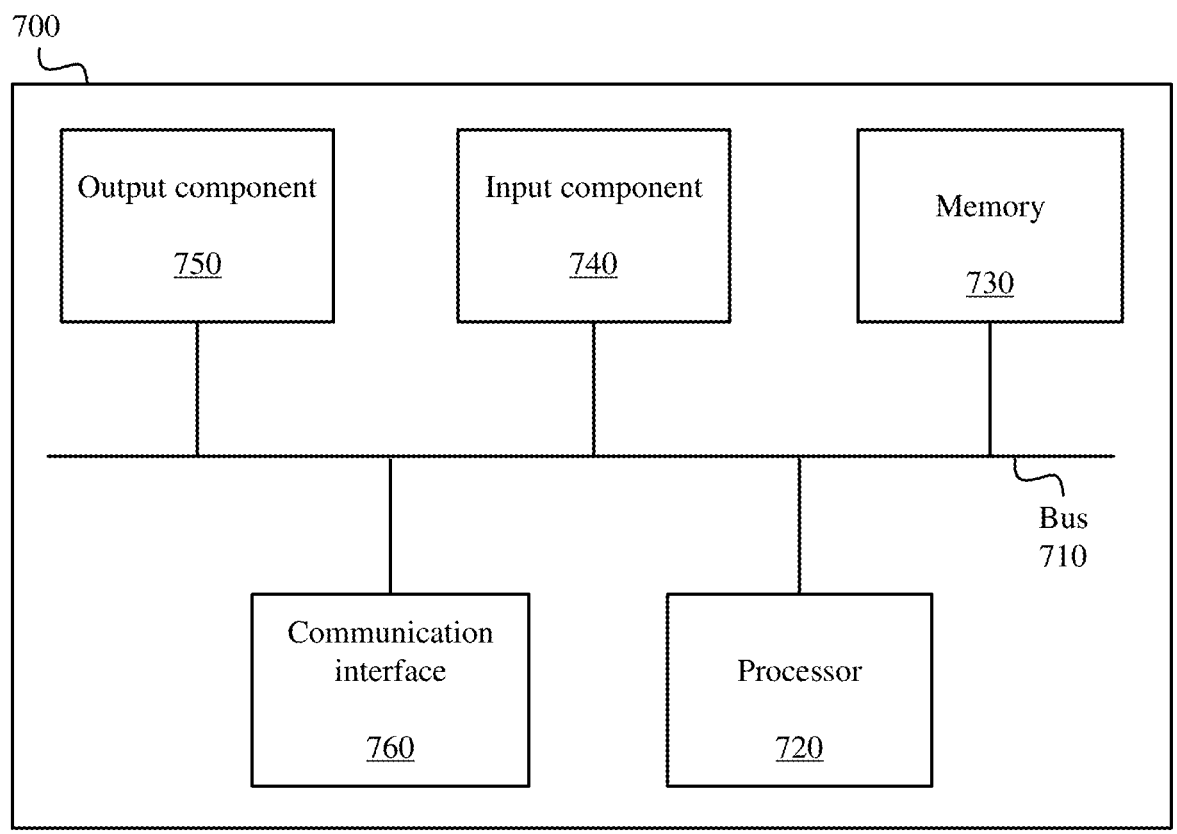
FIG. 7 illustrates example components of one or more devices, according to one or more embodiments described herein.

FIG. 7 is a diagram of example components of device 700. Device 700 may be used to implement certain of the devices described above (e.g., near field transmitter 205 and mobile device 210). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
a magnetometer operating in an extremely low frequency ("ELF") range between 3 to 30 hertz ("HZ"), the magnetometer generating output based on measured fluctuations of a magnetic field in the ELF range; and
a near field detection application triggering an action on said device in response to obtaining two or more values that the magnetometer outputs in sequence at the ELF, and the two or more values decoding to a specific message, wherein triggering the action comprises performing remote control of a remote second device based on the near field detection application (i) authenticating access to the remote second device using a set of security credentials, and (ii) verifying proximity to the remote second device by providing the specific message and by the specific message matching to a most recent identifier associated with the remote second device.

2. The device of claim 1 further comprising a wireless radio, and wherein triggering the action further comprises establishing a network connection with the remote second device via the wireless radio.

3. The device of claim 2, wherein the wireless radio comprises at least one of a Bluetooth radio, WiFi radio, or 4G Long Term Evolution ("LTE") radio.

4. The device of claim 2, wherein triggering the action further comprises issuing a command to the remote second device.

5. The device of claim 1 further comprising a wireless radio communicably coupling to a controller of the second device, and wherein the device unlocks a lock of the remote second device based on said authenticating and said verifying via wireless messaging, that is sent to the controller via the wireless radio in response to triggering the action.

6. The device of claim 1 further comprising a wireless radio communicably coupling to a controller of the remote second device, and wherein the device turns on the remote second device based on said authenticating and said verifying via messaging, that is sent to the controller via the wireless radio in response to triggering the action.

7. The device of claim 1 further comprising a compass establishing a heading based on the output from the magnetometer.

8. The device of claim 1, wherein the near field detection application differentiates between the magnetometer outputting measurements for fluctuations of Earth's magnetic field and measurements of a manipulated magnetic field generated by a near field transmitter.

9. A device comprising:
an antenna;
an electromagnetic field generator operating at an extremely low frequency ("ELF") range, the electromagnetic field generator comprising a circuit generating a manipulated magnetic field with fluctuations that encode a specific message over multiple intervals of the ELF, the electromagnetic field generator distorting measurements of Earth's magnetic field over a particular short distance from the device by transmitting the manipulated magnetic field from the antenna;
a signal generator operating at a frequency greater than 100 kilohertz ("KHz"), the signal generator comprising a circuit generating a signal for communication with one or more of a proximity card, smart card, or Near Field Communication ("NFC") device; and
a wireless network interface establishing a network connection with a second device; and
a controller executing an action in response to the second device providing the specific message encoded in the manipulated magnetic field, the controller comprising a processor for periodically switching between transmission of the manipulated magnetic field from the electromagnetic field generator through the antenna, and transmission of the signal from the signal generator through the antenna.

10. The device of claim 9, wherein the specific message comprises an identifier identifying said device, and wherein the specific message is output as a sequence of changing headings by a magnetometer that is placed within the manipulated magnetic field.

11. The device of claim 9 further comprising a network interface that is communicably coupled with an access control unit that controls access to an entry point adjacent to the device, and wherein the controller proxies access request messaging received from a second device to the access control unit in response to the second device providing the specific message encoded in the manipulated magnetic field.

12. The device of claim 9, wherein the controller electronically controls locking and unlocking of an entry point adjacent to the device, and wherein the controller unlocks the entry point in response to the second device providing the specific message encoded in the manipulated magnetic field.

13. A device comprising:
an antenna;
an electromagnetic field generator operating at an extremely low frequency ("ELF") range, the electromagnetic field generator comprising a circuit generating a manipulated magnetic field with fluctuations that encode a specific message over multiple intervals of the ELF, the electromagnetic field generator distorting measurements of Earth's magnetic field over a particular short distance from the device by transmitting the manipulated magnetic field from the antenna;
a network interface establishing a wireless first network connection with a second device, and a second network connection with an access control unit; and
a controller executing an action in response to the second device providing the specific message encoded in the manipulated magnetic field, wherein executing the action comprises proxying access request messaging received from the second device over the second network connection to the access control unit in response to the second device providing the specific message encoded in the manipulated magnetic field.

14. The device of claim 13 further comprising a signal generator operating at a frequency greater than 100 kilohertz ("KHz"), the signal generator comprising a circuit generating a signal for communication with one or more of a proximity card, smart card, or Near Field Communication ("NFC") device.

15. The device of claim 14, wherein the controller comprises a processor for periodically switching between transmission of the manipulated magnetic field from the electromagnetic field generator through the antenna, and transmission of the signal from the signal generator through the antenna.

16. The device of claim 13, wherein the specific message comprises an identifier identifying said device, and wherein the specific message is output as a sequence of changing headings by a magnetometer that is placed within the manipulated magnetic field.

17. The device of claim 13, wherein the controller electronically controls locking and unlocking of an entry point adjacent to the device, and wherein the controller unlocks the entry point based in part on the second device providing the specific message encoded in the manipulated magnetic field.

* * * * *